July 16, 1957   J. D. WORDIE ET AL   2,799,569
AMMONIUM PHOSPHATE FERTILIZERS
Filed Nov. 29, 1954
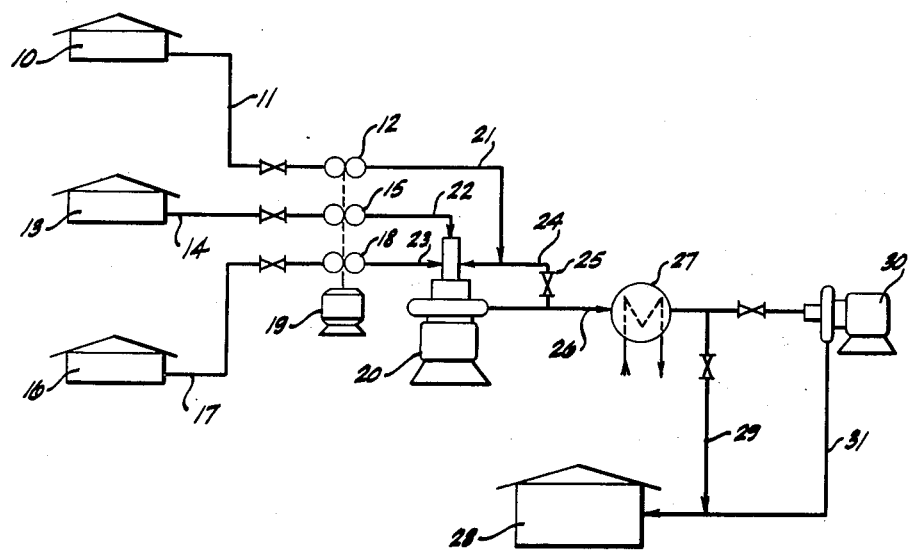
INVENTORS.
JOHN D. WORDIE,
DAVIS A. SKINNER,
BY
Richard C. Newton
ATTORNEY.

United States Patent Office 2,799,569
Patented July 16, 1957

2,799,569

AMMONIUM PHOSPHATE FERTILIZERS

John D. Wordie and Davis A. Skinner, Fullerton, Calif., assignors to Union Oil Company of California, Los Angeles, Calif., a corporation of California Application November 29, 1954, Serial No. 471,639

15 Claims. (Cl. 71—42)

This invention relates to ammonium phosphate fertilizer compositions and to a method for making the same, and in particular concerns aqueous ammonium phosphate compositions prepared from crude "wet process" phosphoric acid.

The manufacture of ammonium phosphate fertilizers by reaction between ammonia and crude "wet process" phosphoric acid involves serious technical difficulties attributable to the presence of impurities in the crude acid. The latter (sometimes referred to as "green acid" by reason of its color) is obtained by treating phosphate rock, which essentially comprises calcium phosphate, with sulfuric acid and filtering off the insoluble calcium sulfate which is thereby formed. The crude "green" acid is a highly impure product containing relatively large amounts of dissolved calcium sulfate, fluorides and fluosilicates, salts of aluminum, magnesium, iron, vanadium and other metals, as well as suspended organic matter and carbon. When such crude acid is treated with ammonia to form either mono- or di-ammonium phosphate, or a mixture of both, the metallic impurities are thrown out of solution as gelatinous precipitates which are substantially impossible to separate from the aqueous phase by filtration. While these solid materials in no way interfere with the plant nutrient properties of the ammonium phosphate (in fact, they are considered to have considerable fertilizer value of their own) they settle in the bottom of the storage vessel and clog pipelines and equipment used for applying the product to the soil. It is for this reason that substantially all of the ammonium phosphate made from crude wet process phosphoric acid for use as a fertilizer is manufactured, marketed and applied to the soil in solid form. However, the expense inherent in evaporating the aqueous material to produce a dry product, together with the cost of packaging and otherwise handling such a product, have seriously limited the use of ammonium phosphate manufactured from crude wet process acid as a fertilizer.

It is accordingly an object of the present invention to provide substantially non-settling liquid fertilizer compositions essentially comprising ammonium phosphate prepared from crude wet process phosphoric acid.

Another object is to provide an improved method for making liquid ammonium phosphate compositions by reaction between crude wet process phosphoric acid and ammonia.

A further object is to provide a means for preventing the metallic and carbonaceous solids which are normally present in ammonium phosphate solutions prepared from crude wet process phosphoric acid from interfering with the handling and use of such solutions as fertilizers or plant nutrients.

Other objects will be apparent from the following detailed description of the invention, and various advantages not specifically referred to herein will occur to those skilled in the art upon employment of the invention in practice.

We have now found that the above and related objects may be realized by effecting the reaction between crude wet process phosphoric acid and ammonia in such manner that the product takes the form of a thin somewhat thixotropic gel in which the insoluble metallic and carbonaceous impurities are uniformly and stably dispersed. More particularly, we have found that by carefully controlling the reaction conditions and employing a recycling technique, the immediate product of the reaction is stable in the sense that it does not deposit infiltrable solids upon standing. Such product is gel-like, having a viscosity between about 20 and about 500 cps. as determined by the Brookfield apparatus but can be pumped, stored and otherwise handled and applied to the soil as a liquid. Furthermore, such product is relatively non-corrosive and can be prepared, stored and shipped in ordinary mild steel equipment.

In general, the process of the invention comprises introducing crude wet process phosphoric acid, ammonia, water and recycled product into a reaction zone wherein they are subjected to violent agitation and a temperature between about 140° F. and about 190° F., the amount of ammonia being controlled so that the hydrogen ion concentration of the product corresponds to a pH value of between about 6.3 and about 6.7 and the amount of water being controlled to provide a total $P_2O_5$ concentration of between about 20 and about 30 percent by weight within the reaction zone. The resulting product contains about 8 percent of nitrogen and about 24 percent of phosphorus calculated as $P_2O_5$, and in terms of effective fertilizing value is known as an "8–24–0" material. Between about 60 and about 90 percent of the product is returned to the reaction zone as the aforesaid recycle stream, and the remainder is cooled and passed to suitable storage facilities. As is hereinafter more fully explained, the phosphoric acid concentration may vary between about 25 and about 55 percent $P_2O_5$, and the ammonia may be employed in gaseous or aqueous form.

Referring now to the single figure of the accompanying drawing which forms a part of this application, which drawing represents a diagrammatic flow sheet illustrating one embodiment of the process of the invention, a stream of crude wet process phosphoric acid is withdrawn from storage facility 10 and is passed through line 11 to proportioning pump 12. Simultaneously, a stream of ammonia is withdrawn from storage facility 13, and is passed through line 14 to proportioning pump 15. Storage facility 16 contains water which, if required to adjust the concentration of the phosphoric acid and ammonia, is passed through line 17 to proportioning pump 18. Pumps 12, 15 and 18 are shown as being driven by a single power source 19, and deliver their respective streams to centrifugal pump 20 through lines 21, 22 and 23, respectively. Prior to being introduced into centrifugal pump 20, the stream of phosphoric acid in line 21 is joined with a product recycle stream passing through line 24 provided with valve 25 which controls the volume of the recycled product. Centrifugal pump 20 comprises the reaction zone wherein the phosphoric acid is neutralized to pH=6.3–6.7 by the ammonia while being subjected to the violent agitation provided by the pump. The latter may be provided with means, not shown, for maintaining the reaction temperature within the aforesaid limits, or such temperature may be controlled by varying the volume of the recycle stream. The discharge stream from the pump constitutes the aqueous ammonium phosphate product, and is passed through line 26 to cooler 27 wherein it is cooled to approximately atmospheric temperature. The recycle stream is bled from line 26 and returned to centrifugal pump 20 as previously explained. The cooled product stream is passed directly from cooler 27 to product storage facility 28 via line 29, or, alternatively, it is passed through a second centrifugal pump 30 before being sent to storage 28 via line 31.

Considering now the process in detail, the phosphoric acid reactant is the previously described crude wet process acid containing various metallic impurities in the form of sulfates, fluorides, phosphates, etc. A complete description of such acid and the process by which it is made is set forth in "Phosphoric Acid, Phosphates and Phosphatic Fertilizer," by W. H. Waggaman, pages 174–208. Such acid is available commercially in both dilute and "concentrated" forms, containing about 25–30 percent and about 35–55 percent $P_2O_5$, respectively, and either concentration may be employed. It is desirable, however, that the $P_2O_5$ concentration in the reaction zone be between about 20 and about 30 percent; accordingly, when more concentrated acid is employed sufficient water should be supplied, either as such or by employing aqueous instead of gaseous ammonia, to attain such $P_2O_5$ concentration in the reaction zone. When concentrated acid containing about 35–55 percent of $P_2O_5$ is employed, it is most convenient to use aqueous ammonia of about 20–30 percent concentration, whereas with dilute acid containing about 20–30 percent $P_2O_5$ it is desirable to use anhydrous ammonia. The former concentration is preferred.

The ammonia is supplied to the reaction zone in such quantity that the reaction product has a pH value between about 6.3 and about 6.7, preferably about 6.5. When phosphoric acid of about 36–40 percent $P_2O_5$ content and aqueous ammonia of about 23–27 percent concentration are employed, the amount of aqueous ammonia required is approximately equal to the amount of phosphoric acid on a volume basis; accordingly, when operating with such reactants the respective rates of feed are approximately equal.

The recycle stream, consisting of a part of the product, is preferably supplied to the reaction zone at a temperature between about 110° F. and about 160° F. and in an amount corresponding to between about 3 and about 7 times the combined volume of the phosphoric acid, ammonia and water reactants. When operating continuously the rate at which the recycle stream is fed to the reactor is thus about 3–7 times the sum of the feed rates of the phosphoric acid and ammonia reactants. By suitably controlling the temperature and amount of recycled product the requisite reaction temperature may be maintained without the addition or subtraction of heat to or from the reaction zone.

As previously stated, successful operation of the present process to produce the desired product depends upon careful temperature control and violent agitation during the reaction. The temperature should be maintained between about 140° F. and about 190° F., preferably between about 150° F. and about 180° F. At temperatures below this range, difficulty is experienced in attaining complete reaction without unduly increasing the volume of the recycle stream whereas at higher temperatures the product obtained is too viscous to be conveniently handled. Ordinarily, the proper temperature can be maintained simply by returning the recycle stream to the reaction zone with slight cooling to about 110° F.–160° F., although if desired the phosphoric acid reactant may be suitably preheated or means may be provided for supplying heat directly to the reaction zone. The requisite violent agitation may be secured in a number of ways, the most convenient of which involves the use of a centrifugal pump as shown in the aforementioned drawing. Alternatively, any of the known types of high-speed stirring devices operating at speeds between 1,000 and 10,000 R. P. M. agitators, colloid mills, homogenizers, or blenders may be employed provided they are capable of exerting strong shearing forces on the reactants.

Cooling of the liquid product may be accomplished by conventional means of heat-exchange, an evaporation cooling tower probably being the most convenient and economical. Usually, the cooled product may be passed directly to suitable storage facilities wherein it can be stored for extended periods of time without any appreciable settling of solids. In some instances, however, as where the acid employed contains an unusually large amount of metallic and carbonaceous impurities, improved stability can be attained by subjecting the cooled product to a second violent agitation treatment as by passing it through another centrifugal pump or equivalent stirring or beating device. The step of subjecting the ammonium phosphate product to violent agitation is further described and claimed in our continuation-in-part application Serial No. 506,717, filed May 9, 1955.

The following examples will illustrate the principle of the invention, but are not to be construed as limiting the same.

*Example I*

Concentrated crude wet process phosphoric acid containing 39.3 percent of $P_2O_5$ was passed continuously into the bottom of a cylindrical vessel at a rate of 19.5 volumes per minute. Aqueous ammonia of 24.9 percent concentration was passed into the same end of the vessel at a rate of 20.2 volumes per minute. A product stream was withdrawn from the vessel at a point near the top, and from such stream a recycle stream was bled off and returned to the bottom of the vessel at a rate of 170 volumes per minute. Violent agitation of the contents of the vessel was secured by means of a four-bladed propeller revolving at high speed. When steady state conditions had been attained, the temperature of the recycle stream at the point where it entered the vessel was 134° F. and the temperature within the vessel was 165° F. The product was cooled and passed to storage. After being allowed to stand quiescent for 24 hours the product had a viscosity of about 58 cps. and deposited only about 3 percent of solids. A sample of the product which had been subjected to violent agitation for 15 minutes in a Waring Blendor exhibited no phase separation whatsoever upon standing for 24 hours and had a viscosity of about 137 cps.

*Example II*

Example I was repeated employing dilute acid and gaseous ammonia. The reaction conditions were as follows:

Phosphoric Acid:
    Concentration _____ 26.6% $P_2O_5$.
    Rate of feed_____ 19.5 vol./min.
Ammonia:
    Concentration _____ 100%.
    Rate of feed_____ 3564 vol./min., STP.
Recycle:
    Temperature _____ 134° F.
    Rate of feed_____ 122 vol./min.
Reaction temperature_____ 165 °F.

The product obtained had a viscosity of 29 cps. after standing for 24 hours and during such period no discernible amount of solids had separated.

As will be apparent to those skilled in the art, the process is capable of being carried out continuously or batchwise, utilizing various types of equipment and various operating techniques. The essence of the invention lies in the process of reacting crude wet process phosphoric acid and recycled product with ammonia at a temperature between about 140° F. and about 190° F. while subjecting the reaction mixture to violent agitation, and in the substantially non-settling product obtained thereby.

Other modes of applying the process of our invention may be employed instead of those explained, change being made as regards the materials and operations employed, provided the product or steps stated by any of the following claims, or the equivalent of such stated products or steps, be obtained or employed.

We, therefore, particularly point out and distinctly claim as our invention:

1. The process of preparing an aqueous ammonium phosphate product which comprises: (1) introducing into a reaction zone: (a) crude wet process phosphoric acid containing normally incident impurities which precipitate as gelatinous solids upon treating the acid with ammonia, (b) ammonia, (c) water, and (d) a recycled portion of the reaction product, the amount of ammonia being such that the reaction product which is subsequently withdrawn from the reaction zone has a pH value between about 6.3 and about 6.7 and the amount of water being such that the total $P_2O_5$ concentration in the reaction zone is between about 20 and about 30 percent by weight; (2) maintaining a temperature between about 140° and about 190° F. within the reaction zone; (3) violently agitating the reaction mixture within the reaction zone; (4) upon completion of reaction and attainment of the aforesaid pH value withdrawing the reaction product from the reaction zone; and (5) returning between about 60 and about 90 percent of the reaction product to the reaction zone as said recycled product, said reaction product being an aqueous solution of ammonium phosphate containing said gelatinous solids suspended therein.

2. The process of claim 1 wherein the phosphoric acid concentration is between about 20 and about 30 percent by weight $P_2O_5$ and the ammonia is employed in anhydrous form.

3. The process of claim 1 wherein the phosphoric acid concentration is between about 35 and about 55 percent by weight $P_2O_5$ and the ammonia is employed in aqueous solution form.

4. The process of claim 1 wherein the temperature within the reaction zone is maintained by controlling the temperature and the amount of the recycled reaction product.

5. The process of claim 1 wherein the temperature within the reaction zone is maintained between about 150° and about 180° F.

6. The process of preparing an aqueous ammonium phosphate product which comprises: (1) introducing into a reaction zone: (a) crude wet process phosphoric acid of between about 20 and about 30 percent by weight $P_2O_5$ concentration and containing normally incident impurities which precipitate as gelatinous solids upon treating the acid with ammonia, (b) anhydrous ammonia in such amount that the reaction product which is subsequently withdrawn from the reaction zone has a pH value between about 6.3 and about 6.7, and (c) recycled reaction product; (2) maintaining a temperature between about 140° and about 190° F. within the reaction zone; (3) subjecting the reaction mixture within the reaction zone to strong shearing forces; (4) upon completion of reaction and attainment of the aforesaid pH value withdrawing the reaction product from the reaction zone; and (5) returning between about 60 and about 90 percent of the reaction product to the reaction zone as said recycled product, said reaction product being an aqueous solution of ammonium phosphate containing said gelatinous solids suspended therein.

7. The process of claim 6 wherein the recycled portion of the reaction product is cooled to a temperature between about 110° and about 160° F. prior to being returned to the reaction zone.

8. The process of preparing an aqueous ammonium phosphate product which comprises: (1) introducing into a reaction zone: (a) crude wet process phosphoric acid of between about 35 and about 55 percent by weight $P_2O_5$ concentration and containing normally incident impurities which precipitate as gelatinous solids upon treating the acid with ammonia, (b) aqueous ammonia in such amount that the reaction product subsequently withdrawn from said reaction zone has a pH value between about 6.3 and about 6.7, (c) recycled reaction product, and (d) water in such amount that the total $P_2O_5$ concentration in the reaction zone is between about 20 and about 30 percent by weight; (2) maintaining a temperature between about 140° and about 190° F. within said reaction zone; (3) subjecting the reaction mixture within said reaction zone to strong shearing forces; (4) upon completion of reaction and attainment of said pH value withdrawing the reaction product from the reaction zone; and (5) returning between about 60 and about 90 percent of the reaction product to said reaction zone as said recycled product, said reaction product being an aqueous solution of ammonium phosphate containing said gelatinous solids suspended therein.

9. The process of claim 8 wherein the temperature within the reaction zone is between about 150° and about 180° F.

10. The process of claim 8 wherein the recycled portion of the reaction product is cooled to between about 110° and about 160° F. prior to being returned to the reaction zone.

11. The process of claim 8 wherein the temperature within the reaction zone is maintained by controlling the temperature and amount of the recycled reaction product.

12. An ammonium phosphate product prepared from crude wet process phosphoric acid by the process defined by claim 1 and characterized by taking the form of a thin slightly thixotropic gel having a Brookfield viscosity between about 20 and about 500 cps., and by containing suspended substantially non-settling solids derived from the metallic and carbonaceous impurities originally present in said crude phosphoric acid.

13. An ammonium phosphate product prepared from crude wet process phosphoric acid by the process defined by claim 6 and characterized by having a pH value of about 6.5, by containing nitrogen and phosphorus in a weight ratio corresponding to about 8 parts of nitrogen per 24 parts of phosphorus calculated as $P_2O_5$, by taking the form of a thin slightly thixotropic gel having a Brookfield viscosity between about 20 and about 500 cps., and by containing suspended and substantially non-settling solids derived from the metallic and carbonaceous impurities originally present in the crude phosphoric acid.

14. The process of claim 1 wherein that portion of the reaction product not returned to the reaction zone is cooled and subjected to violent agitation.

15. The process of claim 8 wherein that portion of the reaction product not returned to the reaction zone is cooled and subjected to strong shearing forces.

References Cited in the file of this patent

UNITED STATES PATENTS

| | | |
|---|---|---|
| 1,167,788 | Washburn | Jan. 11, 1916 |
| 1,716,415 | Buchanan | June 11, 1929 |
| 1,930,883 | Oehme et al. | Oct. 17, 1933 |
| 2,033,388 | Moose | Mar. 10, 1936 |
| 2,033,389 | Moose | Mar. 10, 1936 |